United States Patent [19]

Conway et al.

[11] Patent Number: 4,507,648
[45] Date of Patent: Mar. 26, 1985

[54] DECODING TECHNIQUE FOR MULTIDIMENSIONAL CODES

[75] Inventors: John H. Conway, Cambridge, England; Neil J. A. Sloane, Highland Park, N.J.

[73] Assignee: AT&T Bell Laboratories, Murray Hill, N.J.

[21] Appl. No.: 346,626

[22] Filed: Feb. 8, 1982

[51] Int. Cl.³ .............................................. H03K 13/24
[52] U.S. Cl. ................................ 340/347 DD; 375/38
[58] Field of Search ................... 340/347 DD; 375/26, 375/27, 34, 38, 42

[56] References Cited

U.S. PATENT DOCUMENTS 4,084,137 4/1978 Welti ..................................... 375/38

Primary Examiner—Charles D. Miller
Attorney, Agent, or Firm—Ronald D. Slusky

[57] ABSTRACT

A method and arrangement for decoding n-dimensional codes in which the alphabet of codewords is selected from the points of a lattice comprised of a union of cosets of the lattice $D_n$, the latter being comprised of those n-dimensional integer-valued-coordinate points which have a predetermined parity.

8 Claims, 4 Drawing Figures

DECODING TECHNIQUE FOR MULTIDIMENSIONAL CODES

BACKGROUND OF THE INVENTION

The present invention relates to the decoding of multidimensional codes, such as are used in data transmission systems and in low-quantization-noise quantizers.

A multidimensional code is one in which each codeword is comprised of n elements, $n \geq 2$. For example, each codeword of a four-dimensional code takes the form $(\alpha, \beta, \gamma, \delta)$, where the elements $\alpha$, $\beta$, $\gamma$ and $\delta$ take on predetermined combinations of values. One particularly advantageous application for multidimensional coding is in the transmission of data over a so-called Gaussian channel—a communications channel in which the transmitted signals are corrupted by Gaussian noise. In such a system, each possible value of an input word (typically representing a plurality of data bits to be transmitted) is assigned to a different codeword of a pre-established n-dimensional codeword "alphabet." (In these applications the codewords are also referred to as "data symbols.") As each input word is applied at the transmitting end of the system, the assigned codeword is determined by table look-up or other means and a signal representing the codeword is applied to the channel. At the other end of the channel, the received, noise-corrupted codeword is decoded in a decoder, or decision-forming circuit. The function of the decoder is to form a (hopefully correct) decision as to what codeword was actually transmitted by finding the codeword within the alphabet to which the received noise-corrupted codeword is closest in n-space. The principal advantage of using multidimensional codes in such applications is that, as taught by C. E. Shannon in his classic paper "Communication in the Presence of Noise," Proc. IRE, Vol. 37, Jan., 1949, pp. 10–21, the probability of a decoding error at the receiver can be decreased by increasing the dimensionality of the codewords, given a particular channel and a fixed average power in the transmitted codewords. Examples of multidimensional data communications systems are those shown in U.S. Pat. No. 4,084,137 issued Apr. 11, 1978 to G. R. Welti hereby incorporated by reference.

Another advantageous application of multidimensional coding is in the quantization of analog signals into discrete quantization levels. An alphabet of n-dimensional codewords is pre-established, as before, and the samples of the analog input signal are divided into n-sample words. Each word is then applied to a decoder which finds that codeword within the alphabet to which the n-sample word is closest in n-space. Each of the n elements of the codeword is then used to represent the value of the corresponding analog sample. Advantageously, the average quantization error, i.e., the average difference between each analog sample and the codeword element which represents it, is decreased as the dimensionality of the code is increased. Multidimensional quantization is described more fully, for example, by A. Gersho in "Asymptotically Optimal Block Quantization," *IEEE Trans. On Information Theory*, Vol. IT-25, No. 4, July, 1979.

SUMMARY OF THE INVENTION

A practical problem in the implementation in these other applications of higher-order multidimensional codes, e.g., four-dimensional codes and larger, has been that as the dimensionality of the code increases, the complexity of the circuitry and/or the time required for decoding also increase. The present invention is directed to a decoding technique which is simple and rapidly executable and which, therefore, substantially overcomes this problem.

Our technique, more particularly, is applicable to systems in which the alphabet of codewords is selected from, i.e., is a subset of, the points of a lattice of a particular class. A lattice is a member of the class if it is equal to the union of N cosets of a lattice $D_n$, $N \geq 1$, $D_n$ being comprised of all points in n-space whose coordinates are integers and have a predetermined total parity, the $j^{th}$ of the cosets being equal to $(D_n Y + u_j)$ where Y is a predetermined n-by-n orthogonal rotation matrix and $u_j$ is the $j^{th}$ one of N predetermined n-dimensional translation vectors.

The decoding technique itself is comprised of the following steps:

(a) determine for each j the two n-dimensional integer-valued-coordinate points which are closest and second-closest, respectively, to the point $X_i^j = (X_i - u_j)Y^{-1}$, where $X_i$ is the word to be decoded and $Y^{-1}$ is the inverse of the matrix Y. Of the two points so identified, one will always have been total parity and the other odd total parity; and (b) identify for each j a decision candidate $d_j$ equal to $(h_j Y + u_j)$, where $h_j$ is the one of the two points identified in step (a) which has the same total parity as the points of $D_n$, and provide as the decoded codeword that one of the N decision candidates $d_j$, $j = 1, 2 \ldots N$, which is closest in n-space to $X_i$. (If $j = 1$, there is only one decision candidate so that the desired codeword is simply given by $d_1$.)

In accordance with a feature of the invention, step (a) may be carried out in the following way: The n-dimensional integer-valued-coordinate point to which $X_i^j$ is the closest is found by rounding each coordinate of $X_i^j$ to the nearest integer. The n-dimensional integer-valued coordinate point to which $X_i^j$ is second-closest is found by rounding each coordinate of $X_i^j$ to the nearest integer except that coordinate which is furthest from an integer. The latter coordinate is rounded the "wrong way" i.e., to the integer to which it is second-nearest.

DETAILED DESCRIPTION

Figure 1:
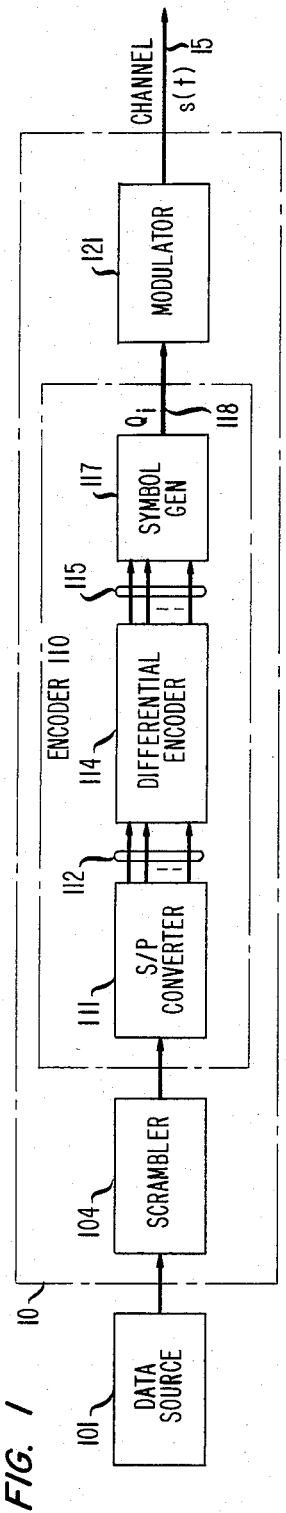
FIG. 1 is a block diagram of a multidimensional data signal transmitter.

Transmitter 10 of FIG. 1 includes a scrambler 104, encoder 110 and modulator 121. Scrambler 104, in particular, receives a stream of binary data from a data source 101 which may be, for example, a digital computer. Scrambler 104 pseudo-randomizes the data to prevent concentrations of energy across the spectrum of the bandpass signal ultimately to be generated.

The output of scrambler 104 is a serial bit stream which is applied to encoder 110. The latter is comprised of a serial-to-parallel converter 111, differential encoder 114 and symbol generator 117. Serial-to-parallel converter 111 converts the bit stream received from scrambler 104 into a sequence of p-bit words, with the bits of each word being provided in parallel form on leads 112. The words on leads 112 are applied to differential encoder 114, the output of which is another sequence of p-bit words (described more fully below), with the bits of each word being provided in parallel form on leads 115. The words on leads 115 are applied to symbol generator 117. The latter responds by extending to modulator 121 over cable 118 representations of n-dimensional data symbols to be transmitted over a communication channel 15. The values of the words on leads 115 are such that the values of successive words on leads 112 are represented by the vector difference between successive pairs of symbols on cable 118. (This approach enables the system to recover from so-called phase hits in the transmission channel.)

Modulator 121 responds to the data symbols provided from symbol generator 117 to generate a double sideband-quadrature carrier signal of the form $$s(t) = Re\left[\sum_m (a_m + jb_m)g(t - mT)e^{j\omega_c t}\right] \quad (1)$$

where T is the so-called baud interval, m is an index which advances at the baud rate 1/T, g is a real function representing a so-called Nyquist pulse, $\omega_c$ is a selected radian carrier frequency and $j = \sqrt{-1}$.

The so-called in-phase and quadrature-phase data symbol components $a_m$ and $b_m$ of Eq. (1) are provided from symbol generator 117 in the following manner: Symbol generator 117 responds to each bit combination on leads 115 by providing to the modulator an n-dimensional data symbol whose value is associated with that bit combination. Since there are $2^p$ possible different bit combinations on leads 115, the symbol "alphabet" is comprised of $2^p$ different symbols. The $i^{th}$ symbol provided to modulator 121 on cable 118 may be represented as the n-dimensional vector $$Q_i = [a_m, b_m, a_{m+1}, b_{m+1} \ldots a_{m+q-1}, b_{m+q-1}] \quad (2)$$

where m=iq and q=n/2. Modulator 121 responds by transmitting symbol components $a_m$ and $b_m$ in accordance with the modulation format of (1) for the $m^{th}$ baud interval, $a_{m+1}$ and $b_{m+1}$ for the $(m+1)^{st}$ baud interval and so forth up through the last pair of components of $Q_i$—$a_{m+q-1}$ and $b_{m+q-1}$—transmitted in the $(m+q-1)^{st}$ baud interval. At this time, symbol $Q_{i+1}$ is available on cable 118 and the process continues. Since each symbol is seen to require q baud intervals for transmission, the symbol rate is 1/qT n-dimensional symbols per second.

Figure 2:
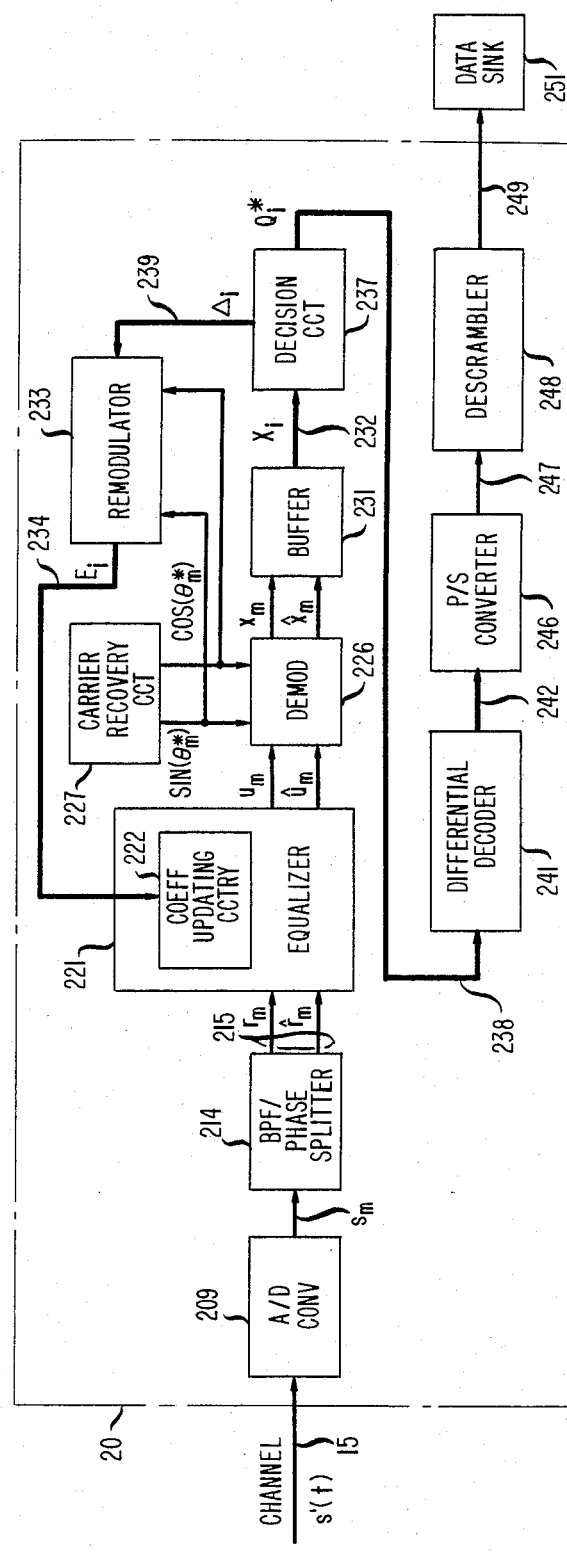
FIG. 2 is a block diagram of a multidimensional data signal receiver which includes a decision circuit embodying the principles of the present invention.

Signal s(t) is corrupted in channel 15 by such impairments as Gaussian noise, phase jitter, frequency offset and intersymbol interference. As shown in FIG. 2, the received corrupted signal s'(t) is applied to A/D converter 209 within receiver 20. A/D converter 209 illustratively operates at the baud rate 1/T. The resulting digital samples, $s_m$, are applied to bandpass filter/phase splitter 214. The latter provides two outputs on leads 215—a digital bandpass-filtered version of $s_m$, denoted $r_m$, and the Hilbert transform of $r_m$—denoted $\hat{r}_m$.

The Hilbert transform pair $r_m$, $\hat{r}_m$ is applied to equalizer 221 which generates a pair of passband outputs $u_m$ and $\hat{u}_m$ which are substantially free of intersymbol interference. More particularly, $u_m$ and $\hat{u}_m$ are generated by equalizer 221 in accordance with the relations $$u_m = \sum_{i=0}^{M} [c_i(m)r_{m-i} - d_i(m)\hat{r}_{m-i}] \quad (3)$$

$$\hat{u}_m = \sum_{i=0}^{M} [c_i(m)\hat{r}_{m-i} + d_i(m)r_{m-i}]$$

where M is a predetermined integer and the $c_i(m)$'s and $d_i(m)$'s are respective ensembles of so-called "tap" coefficients whose values are updated at the baud rate—and hence are a function of m—in a manner described below.

Passband equalizer outputs $u_m$ and $\hat{u}_m$ are demodulated by demodulator 226, yielding baseband signals $x_m$ and $\hat{x}_m$. In particular, $x_m$ and $\hat{x}_m$ are generated by demodulator 226 in accordance with the relations $$x_m = u_m \cos(\theta_m^*) + \hat{u}_m \sin(\theta_m^*) \quad (4)$$

$$\hat{x}_m = \hat{u}_m \cos(\theta_m^*) - u_m \sin(\theta_m^*)$$

where $\theta_m^*$ is an estimate of the current carrier phase (taking into account such impairments as phase jitter and frequency offset). For purposes of generating $x_m$ and $\hat{x}_m$ in accordance with the above relations, demodulator 226 receives digital representations of $\sin(\theta_m^*)$ and $\cos(\theta_m^*)$ from carrier recovery circuit 227.

The outputs of demodulator 226 in successive baud intervals are stored in buffer 231 for q baud intervals. Buffer 231 thereupon provides on cable 232 an n-dimensional received data point, the $i^{th}$ received data point being the n-dimensional vector $$X_i = [x_m, \hat{x}_m, x_{m+1}, \hat{x}_{m+1} \ldots x_{m+q-1}, \hat{x}_{m+q-1}]$$

for m=iq. The received data point is applied to a decision circuit (or decoder) 237 via cable 232. The function of the decision circuit is to form a (hopefully correct) decision $$Q_i^* = [a_m^*, b_m^*, a_{m+1}^*, b_{m+1}^*, \ldots a_{m+q-1}^*, b_{m+q-1}^*]$$

as to what the transmitted data symbol was. As discussed in detail below, the present invention is directed to an advantageous technique for forming that decision.

Decision $Q_i^*$ is applied via cable 238 to differential decoder 241. The differential decoder forms the vector difference between decision $Q_i^*$ and the previous decision, $Q_{i-1}^*$ and, in response to that difference, recovers the $(i-1)^{st}$ transmitted p-bit word, i.e., determines the value of the $(i-1)^{st}$ word provided by serial-to-parallel converter 111 on leads 112. The recovered word is applied via cable 242 to parallel/serial converter 246. The serial output of converter 246 on lead 247 is descrambled in descrambler 248 and the descrambled bit stream is applied via lead 249 to data sink 251. The latter may be, for example, a digital computer or a computer terminal.

In addition to forming decision $Q_i^*$, the decision circuit forms an n-dimensional baseband error signal $\Delta_i$ given by $$\Delta_i = [\delta_m, \hat{\delta}_m, \delta_{m+1}, \hat{\delta}_{m+1} \ldots \delta_{m+q-1}, \hat{\delta}_{m+q-1}],$$

where $$\delta_m = x_m - a_m^*,$$

$$\hat{\delta}_m = \hat{x}_m - b_m^*, \text{ etc.}$$

Baseband error signal $\Delta_i$ is extended via cable 239 to remodulator 233 which forms an n-dimensional passband error signal $$E_i = [e_m, \hat{e}_m, e_{m+1}, \hat{e}_{m+1} \ldots e_{m+q-1}, \hat{e}_{m+q-1}] \quad (5)$$

where $$e_m = \delta_m \cos(\theta_m^*) - \hat{\delta}_m \sin(\theta_m^*),$$

$$\hat{e}_m = \delta_m \sin(\theta_m^*) + \hat{\delta}_m \cos(\theta_m^*)$$

etc.

To this end, remodulator 233, like demodulator 226, receives sin $(\theta_m^*)$ and cos $(\theta_m^*)$ from carrier recovery circuit 227.

The passband error signal $E_i$ is applied via cable 234 to coefficient updating circuitry 222 within equalizer 221. The updating circuitry periodically updates the values of the coefficients used in the equalizer in accordance with a predetermined set of updating equations. Any of various updating equations may be used. One possibility is $$c_i(m+1) = c_i(m) - \alpha[e_{m-1}r_{m-1-i} + \hat{e}_{m-1}\hat{r}_{m-1-i}] \quad (7)$$

$$d_i(m+1) = d_i(m) - \alpha[e_{m-1}\hat{r}_{m-1-i} - \hat{e}_{m-1}r_{m-1-i}]$$

Another possible approach, usable in systems in which $q=2$, is $$c_i(m+1) = c_i(m) - \alpha[e_{m-1}r_{m-1-i} + \hat{e}_{m-1}\hat{r}_{m-1-i}] \quad (8)$$

$$d_i(m+1) = d_i(m) - \alpha[e_{m-1}\hat{r}_{m-1-i} - \hat{e}_{m-1}r_{m-1-i}]$$

$$c_i(m+2) = c_i(m+1) - \alpha\gamma[e_{m+1}r_{m+1-i} + \hat{e}_{m+1}\hat{r}_{m+1-i}]$$
$$- \alpha\bar{\gamma}[e_m r_{m-i} + \hat{e}_m \hat{r}_{m-i}]$$

$$d_i(m+2) = d_i(m+1) - \alpha\gamma[e_{m+1}\hat{r}_{m+1-i} - \hat{e}_{m+1}r_{m+1-i}]$$
$$- \alpha\bar{\gamma}[e_m \hat{r}_{m-i} - \hat{e}_m r_{m-i}]$$

for m even.

For each of these approaches, appropriate values for the parameters, $\alpha$, $\gamma$ and $\bar{\gamma}$ can be determined experimentally under the constraints that $0<\alpha<1$, $0<\gamma<\gamma$ and $\gamma + \bar{\gamma} = 1$.

Carrier recovery circuit 227 determines $\theta_m^*$ in accordance with a predetermined updating equation. One possible such equation is $$\theta_{m+1}^* = \theta_m^* - \beta \left[ \frac{r_m b_m^* + \hat{r}_m a_m^*}{(a_m^*)^2 + (b_m^*)^2} \right]$$

for all m. Another possible approach, usable in systems in which $q=2$, is $$\theta_{m+1}^* = \theta_m^* - \beta \left[ \frac{r_m b_m^* + \hat{r}_m a_m^*}{(a_m^*)^2 + (b_m^*)^2} \right]$$

$$\theta_{m+2}^* = \theta_{m+1}^* - \frac{\beta\epsilon}{2}\left[\frac{r_{m+1}b_{m+1}^* + \hat{r}_{m+1}a_{m+1}^*}{(a_{m+1}^*)^2 + (b_{m+1}^*)^2}\right] -$$

$$\frac{\beta\bar{\epsilon}}{2}\left[\frac{r_m b_m^* + \hat{r}_m a_m^*}{(a_m^*)^2 + (b_m^*)^2}\right]$$

for m even. Again, appropriate values for the parameters $\beta$, $\epsilon$ and $\bar{\epsilon}$ for either of the above alternatives can be determined experimentally under the constraints that $0<\beta<1$, $0<\epsilon<\epsilon$ and $\bar{\epsilon}+\epsilon=1$. (For drawing simplicity, connections to carrier recovery circuit 227 from leads 215 and cable 238 are not shown in FIG. 2, although they would be required in order to enable circuit 227 to determine $\theta_m^*$ in accordance with the above expressions.)

As previously noted, our invention is directed to a technique for rapidly forming decisions $Q_i^*$ in response to received point $X_i$. Our technique is applicable to systems in which the alphabet of symbol values is selected from, i.e., is a subset of, the points of a lattice of a particular class. A lattice is a member of the class if it is equal to the union of N cosets of a lattice $D_n$, $N \geq 1$, $D_n$ being comprised of all points in n-space whose coordinates are integers and having a predetermined total parrity i.e., either an odd sum or an even sum, the $j^{th}$ of the cosets, $j=1, 2 \ldots N$, being equal to $(D_n Y + u_j)$ where Y is a predetermined n-by-n orthogonal rotation matrix and $u_j$ is the $j^{th}$ one of N predetermined n-dimensional translation vectors.

The term "orthogonal matrix" in the above definition means a matrix which, when multiplied by its transpose, yields the identity matrix. The transpose of a matrix has the same elements as that matrix but with the rows and columns interchanged. Thus, for example, the transpose of the matrix.

$$\begin{bmatrix} a & b & c & d \\ e & f & g & h \\ i & j & k & l \\ m & n & o & p \end{bmatrix}$$

is the matrix $$\begin{bmatrix} a & e & i & m \\ b & f & j & n \\ c & g & k & o \\ d & h & l & p \end{bmatrix}$$

The transpose of a matrix is denoted by an apostrophe, e.g., Y'. The identity matrix is a matrix having 1s along its main diagonal and 0s everywhere else. Thus the four-dimensional identity matrix is $$\begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

The term $(D_n Y + u_j)$ used in the definition represents a lattice each of whose points is given by the product of a respective lattice point of $D_n$ with the matrix Y, thereby effecting an n-dimensional rotation, to which product is added the vector $u_j$, thereby effecting a translation of the rotated points.

Our decision-forming, or decoding, technique is based on a number of observations we have made. These observations include the following:

1. The point in a lattice of the above-defined class which is closest to a point $X_i$ can be found by finding the point in each coset making up the lattice which is closest to $X_i$—referred to as a "decision candidate"—and then determining which of the decision candidates is closest to $X_i$ in n-space by, for example, finding the decision candidate whose Euclidian distance to $X_i$ is the smallest.

2. The problem then becomes one of finding the point in each coset which is closest to $X_i$. We have observed that this can be accomplished by performing the following steps for each coset: Subject $X_i$ to the inverse rotation and translation which characterize the coset in question, thereby mapping $X_i$ back into $D_n$. The mapped version of $X_i$ for the $j^{th}$ coset, denoted by $X_i^j$, is equal to $$X_i^j = (X_i - u_j)Y^{-1}$$

where $Y^{-1}$ is the inverse matrix of T. Because Y is an orthogonal matrix, the inverse of Y, $Y^{-1}$, is equal to its transpose, Y'. The point in $D_n$ which is closest to $X_i^j$, denoted by $h_j$, is then found. The point in the $j^{th}$ coset which is closest to $X_i$ is then given by $(h_jY + u_j)$, i.e., by subjecting $h_j$—which is a point in $D_n$—to the rotation and translation which characterize the coset.

3. The problem then becomes one of finding the point in $D_n$ which is closest to $X_i^j$. We have observed that if one finds the two n-dimensional integer-valued-coordinate points which are closest and second closest, respectively, to $X_i^j$, one of those two points will always have an even total parity and the other will always have an odd total parity. The one of these points which has the same total parity as have the points of $D_n$ is, in fact, the point in $D_n$ which is closest to $X_i^j$.

4. The problem then becomes one of finding the two n-dimensional integer-valued-coordinate points which are the closest and second closest to $X_i^j$. We have observed that the closest point is found by rounding each coordinate of $X_i^j$ to the nearest integer and that the second closest point is found by rounding each coordinate of $X_i^j$ to the nearest integer except that one which is furthest from an integer. The latter coordinate is rounded the "wrong way," i.e., to the integer to which it is second-nearest. In the case of a tie, i.e., when two or more coordinates of $X_i^j$ are equally the furthest away from an integer, the one which is to be rounded the "wrong way" can be picked arbitrarily. As an example, assume that $X_i^j = (0.9, -1.1, 1.8, 2.0)$. The closest four-dimensional integer-valued-coordinate point is $(1, -1, 2, 2)$. The second-closest point is $(1, -1, 1, 2)$ because the third coordinate of $X_i^j$, 1.8, is the furthest from an integer. That coordinate is rounded not to the nearest integer, i.e., not to "2," but to the second-nearest integer, i.e., to "1".

The decision-forming, or decoding, technique of the present invention is thus comprised of the following steps:

(a) determine for each j the two n-dimensional, integer-valued-coordinate points which are closest and second-closest, respectively, to the point $X_i^j = (X_i - u_j)Y^{-1}$;

(b) identify for each j a decision candidate $d_j$ equal to $(h_jY + u_j)$, where $h_j$ is the one of the two points identified in step (a) which has the same predetermined total parity as the points of $D_n$ and provide as the decision, i.e., as the decoded codeword, that one of the N decision candidates $d_j$, $j = 1, 2 \ldots N$ which is closest in n-space to $X_i$.

An example: Assume that the symbols of the alphabet are taken from an eight-dimensional lattice which is equal to the union of two cosets of $D_8$, with $D_8$ being defined as the lattice of all points in 8-space whose coordinates are integers and have even total parity. Assume, in particular, that the rotation matrix, Y, is $$Y = \begin{bmatrix} 1/\sqrt{2} & 1/\sqrt{2} & 0 & 0 & 0 & 0 & 0 & 0 \\ 1/\sqrt{2} & -1/\sqrt{2} & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

and that the two translation vectors are $$u_1 = (0, 0, 0, 0, 0, 0, 0, 0)$$

$$u_2 = \left(\frac{1}{\sqrt{2}}, 0, \frac{1}{2}, \frac{1}{2}, \frac{1}{2}, \frac{1}{2}, \frac{1}{2}, \frac{1}{2}\right)$$

Now assume that the symbol $$Q_i = \left(\frac{3\sqrt{2}}{2}, 0, \frac{1}{2}, \frac{1}{2}, \frac{1}{2}, \frac{1}{2}, \frac{1}{2}, \frac{1}{2}\right)$$

(2.12, 0.0, 0.5, 0.5, 0.5, 0.5, 0.5, 0.5)

is transmitted. That this symbol is, in fact, a point in the lattice in question can be seen by multiplying the point $(1, 1, 0, 0, 0, 0, 0, 0)$, which is a point in $D_8$, by Y and then adding $u_2$. (The way in which vectors and matrices are added and multiplied is described in any matrix algebra textbook and need not be discussed here.) Assume, further, that the received point is $$X_i = (2.38, -0.61, 0.51, 0.46, 0.36, 0.51, 0.61, 0.55).$$

The above-outlined steps are then performed as follows:

Step (a): Form $(X_i^j = (X_i - u_j)Y^{-1})$ for each j. (In this example, $Y^{-1} = Y' = Y$.) This yields $$X_i^1 = (1.25, 2.11, 0.51, 0.46, 0.36, 0.51, 0.61, 0.55)$$
$$X_i^2 = (0.75, 1.61, 0.01, -0.04, -0.14, 0.01, 0.11, 0.05).$$

Then find the eight-dimensional, integer-valued-coordinate points that are closest and second-closest to $X_i^1$ and $X_i^2$:

| | |
|---|---|
| closest point to $X_i^1$ | (1, 2, 1, 0, 0, 1, 1, 1) |
| second-closest point to $X_i^1$ | (1, 2, 1, 0, 0, 0, 1, 1) |
| closest point to $X_i^2$ | (1, 2, 0, 0, 0, 0, 0, 0) |
| second-closest point to $X_i^2$ | (1, 1, 0, 0, 0, 0, 0, 0) |

Step (b): Identify $h_1$ and $h_2$ as the points found in step (a) which have even total parity.

$$h_1 = (1, 2, 1, 0, 0, 0, 1, 1)$$

-continued
$$h_2 = (1, 1, 0, 0, 0, 0, 0, 0)$$

The decision candidates are then $$d_1 = (h_1Y + u_1) = (2.12, -.71, 1, 0, 0, 0, 1, 1)$$
$$d_2 = (h_2Y + u_2) = (2.12, 0, 0.5, 0.5, 0.5, 0.5, 0.5, 0.5)$$

To determine which of $d_1$ and $d_2$ is closer to $X_i$, we calculate the squared distances $d_1$ to $X_i$ and $d_2$ to $X_i$:

$$(X_i - d_1)^2 = (.26)^2 + (.10)^2 + (-.49)^2 + (.46)^2 +$$
$$(.36)^2 + (.51)^2 + (-.39)^2 + (-.45)^2$$
$$= 1.27$$
$$(X_i - d_2)^2 = (.26)^2 + (-.61)^2 + (.01)^2 + (-.04)^2 +$$
$$(-.14)^2 + (.01)^2 + (.11)^2 + (.05)^2$$
$$= 0.48$$

Since $d_2$ is closer to $X_{i\,l\,than\,d1}$, the decoder decides that $d_2$ is the transmitted symbol, which is correct.

The foregoing is, of course, merely illustrative. Our invention can be used for any value of n and for any value of $N \geq 1$. In the case $N=1$, in particular, the lattice from which the alphabet of symbols is picked comprises a single coset. In such a case there is only one $X_i^j$, i.e., $X_i^1$, and no distances need be calculated; the "closest" decision candidate to $X_i^1$ is the only decision candidate, i.e., $d_1$.

The invention can also be used when the cosets are formed without rotation, i.e., Y is the identity matrix, in which case $X_i^j$ would be equal to $(X_i - u_j)$. Moreover, as seen in the above example, our invention can be used when one of the cosets is not translated, i.e., $u_1$ is a null vector. And, of course, the invention can be used when there is neither rotation nor translation, this necessarily being a case for which $N=1$.

The particular lattice and subset of lattice points selected to construct an alphabet for a particular application will be chosen in accordance with criteria which form no point of the present invention. By way of example, however, two eight-dimensional alphabets which seem to be particularly advantageous for Gaussian channel coding applications may be noted.

The first alphabet is based on a lattice which is equal to the union of two cosets of the even-parity $D_8$ lattice, those cosets being $D_8 + (1, 0, 0, 0, 0, 0, 0, 0)$ and $D_8 + (3/2, \frac{1}{2}, \frac{1}{2}, \frac{1}{2}, \frac{1}{2}, \frac{1}{2}, \frac{1}{2}, \frac{1}{2})$. The alphabet is comprised of $2^{16} = 65,536$ symbols, i.e., $p=16$, and is shown in Table I.

TABLE I

| Norm | Form of Symbol | Sign Restrictions | Group Size |
|---|---|---|---|
| 1 | $1^7 0$ | — | 16 |
| 2 | $\frac{1}{2}^8$ | odd | 128 |
| 3 | $1^3 0^5$ | — | 448 |
| 4 | $\frac{3}{2} \frac{1}{2}^7$ | even | 1024 |
| 5 | $2 1 0^6$ | — | 224 |
| 5 | $1^5 0^3$ | — | 1792 |
| 6 | $\frac{3}{2}^2 \frac{1}{2}^6$ | odd | 3584 |
| 7 | $2 1^3 0^4$ | — | 4480 |
| 7 | $1^7 0$ | — | 1024 |
| 8 | $\frac{5}{2} \frac{1}{2}^7$ | odd | 1024 |
| 8 | $\frac{3}{2}^3 \frac{1}{2}^5$ | even | 7168 |
| 9 | $2^2 1 0^5$ | — | 1344 |
| 9 | $2 1^5 0^2$ | — | 10752 |
| 10 | $\frac{5}{2} \frac{3}{2} \frac{1}{2}^6$ | even | 7168 |
| 10 | $\frac{3}{2}^4 \frac{1}{2}^4$ | odd | 8960 |
| 11 | $2^2 1^3 0^3$ | — | 16400 |

Each line entry in Table I represents a group of symbols. With the exception of the last group (as discussed below), each group having a dash (-) in the "sign restriction" column includes the symbol specified in the "form of symbol" column (the notation $10^7$, for example meaning $(1, 0, 0, 0, 0, 0, 0, 0)$) plus every distinct permutation of the positive and negative value of each coordinate of that symbol. For example, the groups represented by the first line entry includes all symbols having either a "1" or a "−1" as one coordinate and a "0" as each of the other seven coordinates, for a total of sixteen symbols in the group. A group having the word "odd" or "even" in the sign restriction column includes only those permutations which have an odd or even number of minus signs as specified. For example, the group represented by the fourth line entry includes the point $(-\frac{1}{2}, \frac{1}{2}, \frac{1}{2}, \frac{1}{2}, -3/2, \frac{1}{2}, \frac{1}{2}, \frac{1}{2})$ but not the point $(-\frac{1}{2}, \frac{1}{2}, \frac{1}{2}, \frac{1}{2}, 3/2, \frac{1}{2}, \frac{1}{2}, \frac{1}{2})$. The "norm" of each group, shown in the first column of the table, is proportional to the signal energy of each symbol in the group and is given by the sum of the squares of the coordinates of the symbol.

The group defined by the last line entry has more members than are needed to make up a $2^{16}$-element alphabet. Thus the alphabet does not include all of the members of this group; those members of the group which are included in the alphabet are selected in any desired way.

The alphabet shown in Table I is particularly advantageous in applications in which the overriding concern is to minimize the average power in the transmitted signal (assuming that the probability that a particular symbol will be transmitted is the same as that for every other symbol). The average signal energy is proportional to the average norm, which for this alphabet is 9.03.

In a system such as that of FIGS. 1 and 2, it may also be desirable to minimize the maximum power in any pair of coordinates within any symbol because the coordinates are transmitted two-at-a-time, and the larger the power in any coordinate pair, the greater the likelihood that significant nonlinear distortion will be introduced by the channel. The maximum norm for any pair of coordinates in the alphabet of Table I is $8\frac{1}{2}$. An alphabet which has a lower maximum coordinate pair norm—8—although a somewhat higher average norm—9.31—is shown in Table II.

TABLE II

| Norm | Form of Symbol | Sign Restrictions | Group Size |
| --- | --- | --- | --- |
| 0 | $0^8$ | — | 1 |
| 2 | $1^2\, 0^6$ | — | 112 |
| 2 | $\frac{1}{2}^8$ | even | 128 |
| 4 | $1^4\, 0^4$ | — | 1120 |
| 4 | $2\, 0^7$ | — | 16 |
| 4 | $\frac{3}{2}\, \frac{1}{2}^7$ | odd | 1024 |
| 6 | $1^6\, 0^2$ | — | 1792 |
| 6 | $2\, 1^2\, 0^5$ | — | 1344 |
| 6 | $\frac{3}{2}^2\, \frac{1}{2}^6$ | even | 3584 |
| 8 | $1^8$ | — | 256 |
| 8 | $2\, 1^4\, 0^3$ | — | 8960 |
| 8 | $2^2\, 0^6$ | — | 112 |
| 8 | $\frac{5}{2}\, \frac{1}{2}^7$ | even | 1024 |
| 8 | $\frac{3}{2}^3\, \frac{1}{2}^5$ | odd | 7168 |
| 10 | $2^2\, 1^2\, 0^4$ | — | 6720 |
| 10 | $2\, 1^6\, 0$ | — | 7168 |
| 10 | $\frac{3}{2}^4\, \frac{1}{2}^4$ | even | 8960 |
| 12 | $2^2\, 1^4\, 0^2$ | — | 16047 |

This alphabet is based on a lattice which, again, is equal to the union of two cosets of the even-parity $D_8$ lattice, those cosets being $D_8$ itself and the coset $D_8 + (\frac{1}{2}, \frac{1}{2}, \frac{1}{2}, \frac{1}{2}, \frac{1}{2}, \frac{1}{2}, \frac{1}{2}, \frac{1}{2})$.

Figure 3:
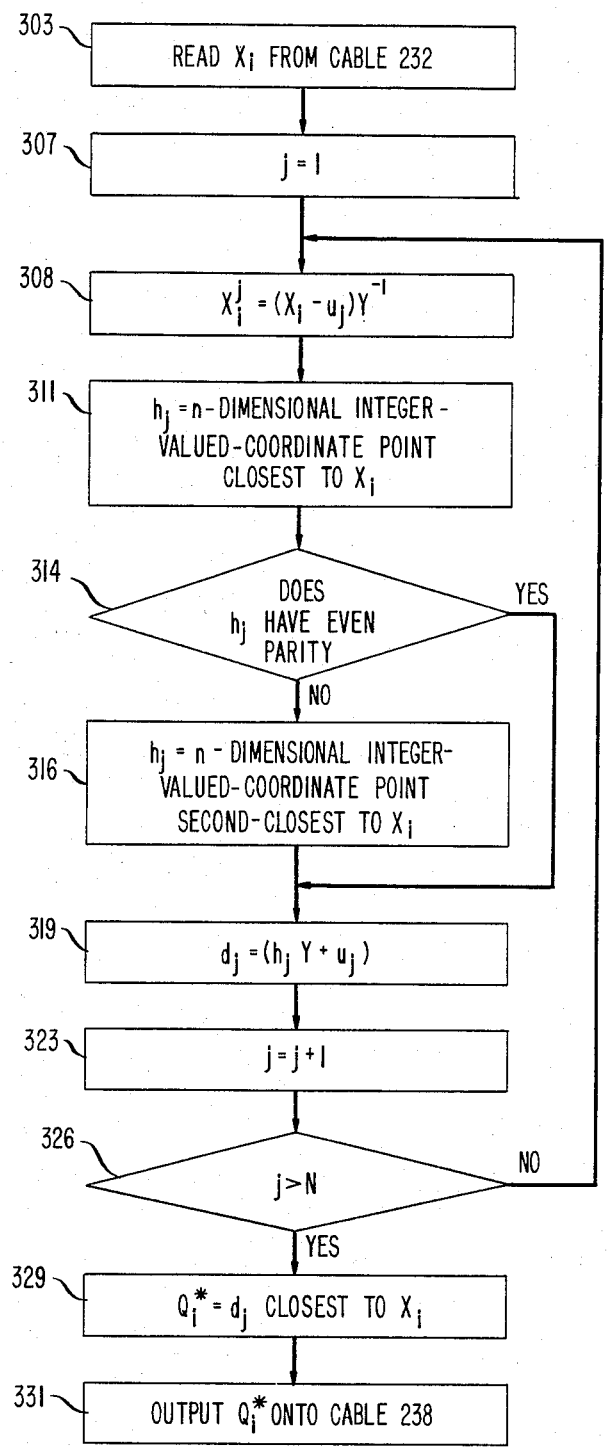
FIG. 3 is a flowchart of a process illustratively used in the decision circuit to implement the decision-forming, or decoding, technique of the present invention.

FIG. 3 is a flowchart of an illustrative process performed in decision circuit 237 to carry out the above-described decision-forming, or decoding, technique. As indicated at 303, the process begins by reading $X_i$ from cable 232. The index j is then set to "1" as indicated at 307. The first $X_i^j$, i.e., $X_i^1$ is then computed at 308 and, as indicated at 311, $h_j$ is set to equal the n-dimensional integer-valued-coordinate point closest to $X_i$. This, of course, can only be a tentative value of $h_j$ since the point closest to $X_i$ may not have the correct—in this case, even—parity. If the total parity is, in fact, even, as checked at 314, $d_j$ is immediately determined at 319. Otherwise, $d_j$ is determined only after $h_j$ is reset to be equal to the n-dimensional inter-valued-coordinate point which is second-closest to $X_i$, as indicated at 316. Index j is then incremented to "2", as indicated at 323, and compared to N, as indicated at 326. If j is not greater than N, the process returns to 308 to determine the next $X_i^2$, and so forth. When, ultimately the comparison at 326 indicates that j is greater than N, $X_i^j$ will have been determined for all values of j. $Q_i^*$ can now be determined, as indicated at 329, as being the $d_j$ which is closest in n-space to $X_i$. A signal representing $Q_i^*$ is then output onto cable 238.

Figure 4:
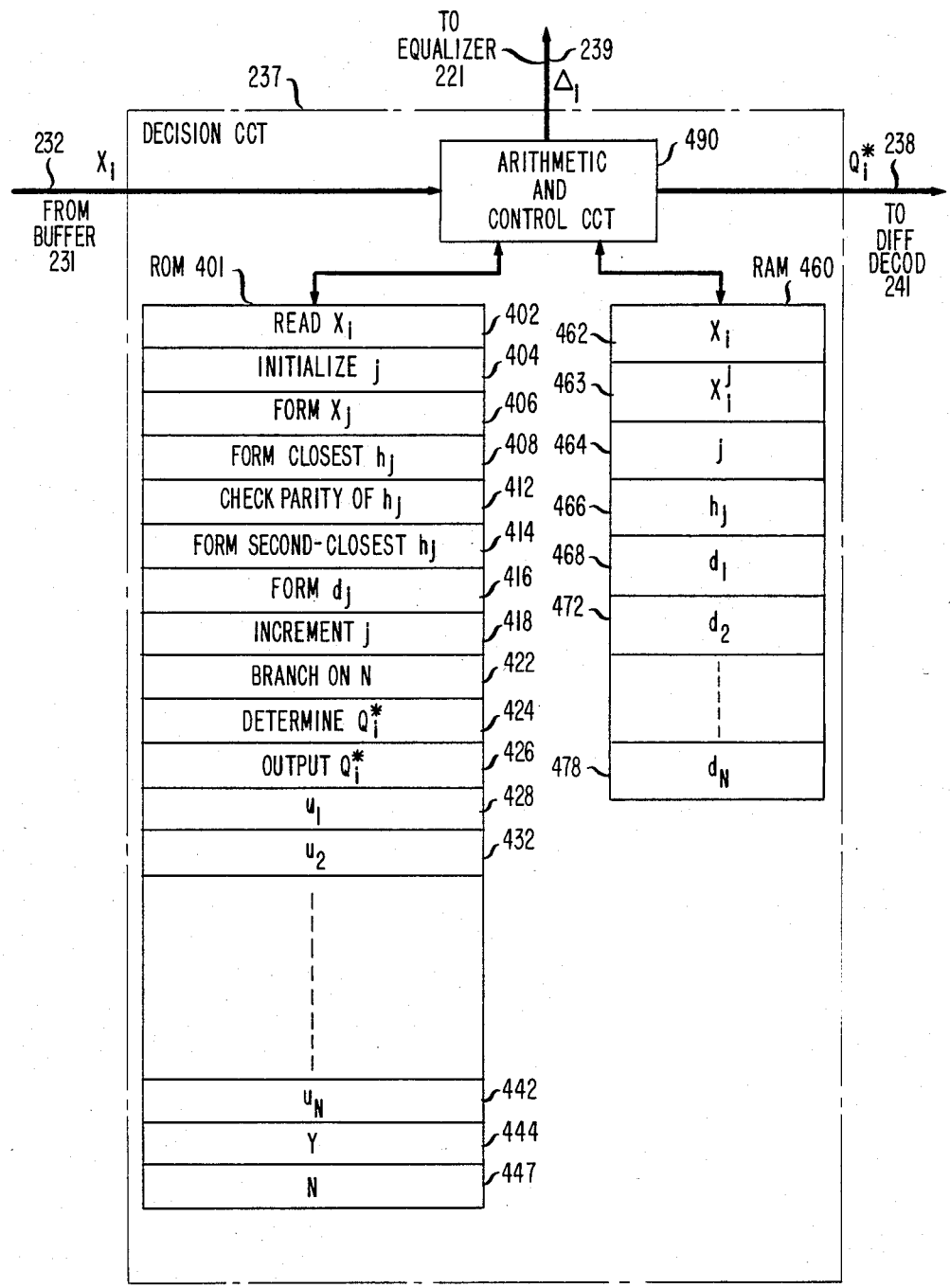
FIG. 4 is a block diagram of an illustrative realization of the decision circuit.

An illustrative realization of decision circuit 237 is shown in FIG. 4. (A substantially identical circuit can be used as a multidimensional quantizer in accordance with the invention.) Circuit 237 is comprised of three elements—read-only memory (ROM 401), random-access memory 460 and arithmetic and control circuit 490. The latter includes gates, adders, accumulators, input-/output circuitry, memory interface circuitry, registers, timing circuitry and other circuitry necessary to perform the process depicted in FIG. 3. ROM 401 includes microcoded instructions which are executed by circuit 490 in performing the process. Each of the reference numerals 402 through 426 in FIG. 4 refers to one or more microcoded instructions stored in the ROM, there being the following general correspondence between the steps of the process of FIG. 3 and the instructions in ROM 401:

| Process Step | ROM Instructions |
| --- | --- |
| 303 | 402 |
| 307 | 404 |
| 308 | 406 |
| 311 | 408 |
| 314 | 412 |
| 316 | 414 |
| 319 | 416 |
| 323 | 418 |
| 326 | 422 |
| 329 | 424 |
| 331 | 426 |

ROM 401 also holds translation vectors $u_1, u_2 \ldots u_N$, as indicated at 428, 432 . . . 442; rotation matrix Y, indicated at 444 and the parameter N, indicated at 447. (Since $Y^{-1}$ is equal to the transpose of Y, the former need not be stored. Multiplication of $(X_i - u_j)$ by $Y^{-1}$ in step 308 of the process of FIG. 3 is accomplished by appropriate multiplication of the coordinates of $(X_i - u_j)$ by the elements of matrix Y.)

RAM 460 includes a number of storage locations in which various variables used in the process depicted in FIG. 3 are stored. These include $X_i$, $X_i^j$, j and $h_j$, stored in locations 462, 463, 464 and 466, respectively, and $d_1$, $d_2 \ldots d_N$ stored in locations 468, 472 . . . 478, respectively.

In this, as in virtually every data transmission system, a decoding error can occur if the transmitted symbol is so highly corrupted by noise that the received signal, $X_i$, is closer to a different symbol in the alphabet than the one that was actually transmitted. In the present decoding technique, it is also possible that the identified codeword, although a point in the lattice, is not a point in the alphabet, i.e., is not one of the selected $2^p$ lattice points. This eventuality can be dealt with in any of several ways. Perhaps the simplest is to do nothing, in which case a random (and, of course, incorrect) p-bit word will occasionally be provided on cable 242.

Although a specific embodiment of our invention is shown and described herein, such merely illustrates the principles of the invention. Those skilled in the art will be able to devise numerous other arrangements which, although not specifically shown or described herein, embody those principles and which therefore do not depart from their spirit and scope.

What is claimed is:

1. Circuitry for use in a data communication system in which inputted data signals are modulated onto a carrier signal to generate a modulated signal representative of one of a predetermined plurality of n-dimensional codewords and in which said modulated signal is supplied to a data communication channel, said circuitry comprising means for receiving from said data communication channel said modulated signal, means for demodulating said received modulated signal to generate a signal representative of an n-dimensional point $X_i$, said plurality of codewords being a selected subset of the points of a predetermined lattice, said lattice being equal to the union of N cosets of a lattice $D_n$, $N \geq 1$, $D_n$ being comprised of those n-dimensional, integer-valued-coordinate points which have a predetermined parity, the $j^{th}$ of said cosets being equal to $D_n Y + u_j$, where Y is a predetermined n-by-n orthogonal matrix and $u_j$ is a predetermined n-dimensional vector, means for generating for each value of j the two n-dimensional integer-valued-coordinate points which are closest and second closest, respectively, to the point $X_i^j = (X_i - u_j) Y^{-1}$, $Y^{-1}$ being the inverse of the matrix Y, and means for identifying for each value of j a codeword decision candidate equal to $(h_j Y + u_j)$, $h_j$ being the one of said two points which has said predetermined parity, and for providing to an output a signal representing the codeword decision candidate which is closest in n-space to $X_i$.

2. The invention of claim 1 wherein said means for generating includes means for determining the first of said two points by rounding to the nearest integer each coordinate of $X_i^j$ and for determining the second of said two points by rounding to the nearest integer each coordinate of $X_i^j$ except the coordinate of $X_i^j$ which is furthest from an integer, said furthest coordinate being rounded to the second-nearest integer.

3. Circuitry for use in a communication system, said circuitry comprising means for receiving inputted data signals, means for generating a stream of n-dimensional signals representing respective n-dimensional codewords, the value of each codeword being a function of the value of at least an associated one of said inputted data signals, each codeword being a point of a predetermined lattice, said lattice being equal to the union of N cosets of a lattice $D_n$, $N \geq 1$, $D_n$ being comprised of those n-dimensional, integer-valued-coordinate points which have a predetermined parity, the $j^{th}$ of said cosets being equal to $D_n Y + u_j$, where Y is a predetermined n-by-n orthogonal matrix and $u_j$ is a predetermined n-dimensional vector, means for modulating each of said n-dimensional signals onto a carrier signal and for applying each of the resulting modulated n-dimensional signals to a data communication channel, and processing means for receiving said modulated signals from said channel and for demodulating each of those received signals to generate a signal representative of an n-dimensional point, the $i^{th}$ such point being $X_i$, means for generating for each value of j the two n-dimensional integer-valued-coordinate points which are closest and second closest, respectively, to the point $X_i^j = (X_i - u_j) Y^{-1}$, $Y^{-1}$ being the inverse of the matrix Y, means for identifying for each value of j a decision candidate equal to $(h_j Y + u_j)$, $h_j$ being the one of said two points which has said predetermined parity, and means for forming as a decision as to the value of an individual one of said codewords a signal representing the decision candidate which is closest in n-space to $X_i$ and for supplying that signal to an output.

4. The invention of claim 3 wherein said means for generating includes means for determining the first of said two points by rounding to the nearest integer each coordinate of $X_i^j$ and determining the second of said two points by rounding to the nearest integer each coordinate of $X_i^j$ except the coordinate of $X_i^j$ which is furthest from an integer, said furthest coordinate being rounded to the second-nearest integer.

5. The invention of claims 3 or 4 further comprising means responsive to said decisions for determining the values of said input signals.

6. A method for use in a data communication system, said method comprising the steps of generating from inputted data signals a stream of n-dimensional signals representing respective n-dimenisonal codewords, the value of each codeword being a function of the value of at least an associated one of said inputted data signals, each codeword being a point of a predetermined lattice, said lattice being equal to the union of N cosets of a lattice $D_n$, $N \geq 1$, $D_n$ being comprised of those n-dimensional, integer-valued-coordinate points which have a predetermined parity, the $j^{th}$ of said cosets being equal to $D_n Y + u_j$, where Y is a predetermined n-by-n orthogonal matrix and $u_j$ is a predetermined n-dimensional vector, modulating each of said n-dimensional signals onto a carrier signal and applying each of the resulting modulated n-dimensional signals to a data communication channel, receiving said modulated signals from said channel and demodulating each of those received signals to generate a signal representative of an n-dimensional point, the $i^{th}$ such point being $X_i$, generating for each value of j the two n-dimensional integer-valued-coordinate points which are closest and second closest, respectively, to the point $X_i^j = (X_i - u_j) Y^{-1}$, $Y^{-1}$ being the inverse of the matrix Y, identifying for each value of j a decision candidate equal to $(h_j Y + u_j)$, $h_j$ being the one of said two points which has said predetermined parity, and outputting as a decision as to the value of an individual one of said codewords a signal representing the decision candidate which is closest in n-space to $X_i$.

7. The invention of claim 6 wherein said generating step includes the steps of determining the first of said two points by rounding to the nearest integer each coordinate of $X_i^j$, and determining the second of said two points by rounding to the nearest integer each coordinate of $X_i^j$ except the coordinate of $X_i^j$ which is furthest from an integer, said furthest coordinate being rounded to the second-nearest integer.

8. The invention of claims 6 or 7 comprising the further step of determining the values of said input signals in response to said decisions.

* * * * *

UNITED STATES PATENT AND TRADEMARK OFFICE
CERTIFICATE OF CORRECTION

PATENT NO. : 4,507,648

DATED : March 26, 1985

INVENTOR(S) : John H. Conway and Neal J.A. Sloane

It is certified that error appears in the above-identified patent and that said Letters Patent is hereby corrected as shown below:

Column 4, line 8, "$u_m$" should read --$\hat{u}_m$--; line 49, "$Q_i^*$" should read --$Q_i^*$--; line 51, "$Q_i^*$" should read --$Q_i^*$--; line 52, "$Q_{i-1}^*$" should read --$Q_{i-1}^*$--; line 62, "$Q_i^*$" should read --$Q_i^*$--. Column 5, line 13, "$\delta_{\hat{m}}\cos$" should read --$\delta_m\cos$--; line 20, "$(\theta_m^*)$" both instances should read --$(\theta_m^*)$--; line 35, "approăch" should read --approach--; line 41, "$\hat{c}_i$" (2nd occurrence) should read --$c_i$--.

line 42, "$\hat{e}_m r_{m-i}$" should read --$\hat{e}_m \hat{r}_{m-i}$--; line 45, "$[e_m r_{m-i} - e_m r_{m-i}]$" should read --$[e_m \hat{r}_{m-i} - \hat{e}_m r_{m-i}]$--; line 49, "$\alpha$, $\gamma$ and $\gamma$" should read --$\alpha$, $\gamma$ and $\bar{\gamma}$--; line 50, "$0<\gamma<\gamma$" should read --$0<\gamma<\bar{\gamma}$--; line 52, "$\theta_m^*$" should read --$\theta_m^*$--; line 57, "$\bar{=}$" should read --=--. Column 6, line 14, "$0<\epsilon<\epsilon$" should read --$0<\bar{\epsilon}<\epsilon$--; line 18, "$\theta_m^*$" should read --$\theta_m^*$--; line 21, "$Q_i^*$" should read --$Q_i^*$--; line 30, "partity" should read

UNITED STATES PATENT AND TRADEMARK OFFICE
CERTIFICATE OF CORRECTION

PATENT NO. : 4,507,648

DATED : March 26, 1985

INVENTOR(S) : John H. Conway and Neal J. A. Sloane

It is certified that error appears in the above-identified patent and that said Letters Patent is hereby corrected as shown below:

--parity--. Column 7, line 65, "$u_{j-}$" should read --$u_j$--.

Column 9, line 19, "$X_{i1}$ than $d_1$" should read --$X_i$ than $d_1$--. Column 11, line 65, "$Q_i^*$" should read --$Q_i^*$--; line 67, "$Q_i^*$" should read --$Q_i^*$--. Column 14, line 26, "dimenisonal" should read --dimensional--.

*Signed and Sealed this*

Twenty-ninth Day of October 1985

[SEAL]

Attest:

DONALD J. QUIGG

Attesting Officer

Commissioner of Patents and
Trademarks—Designate